Patented Feb. 19, 1946

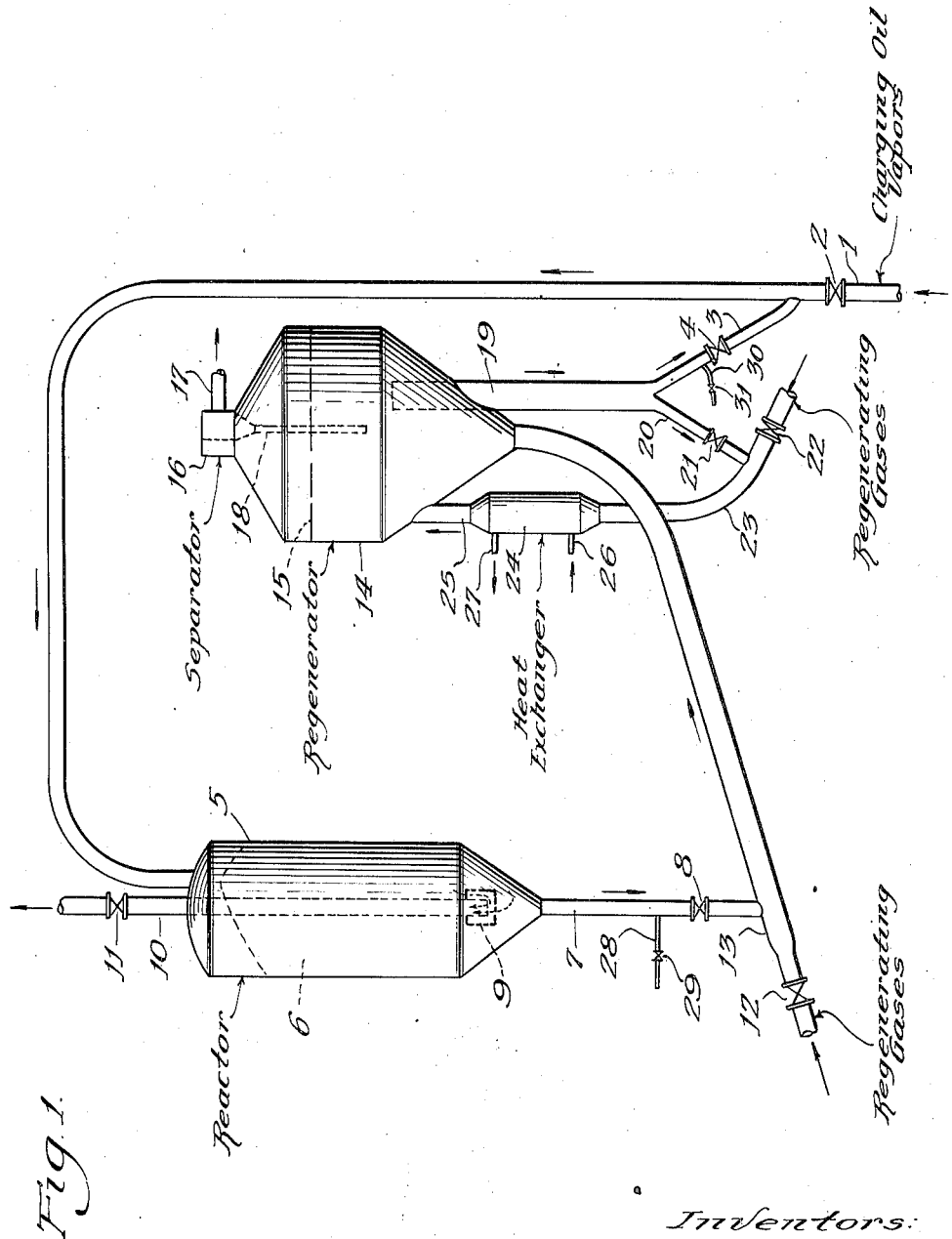

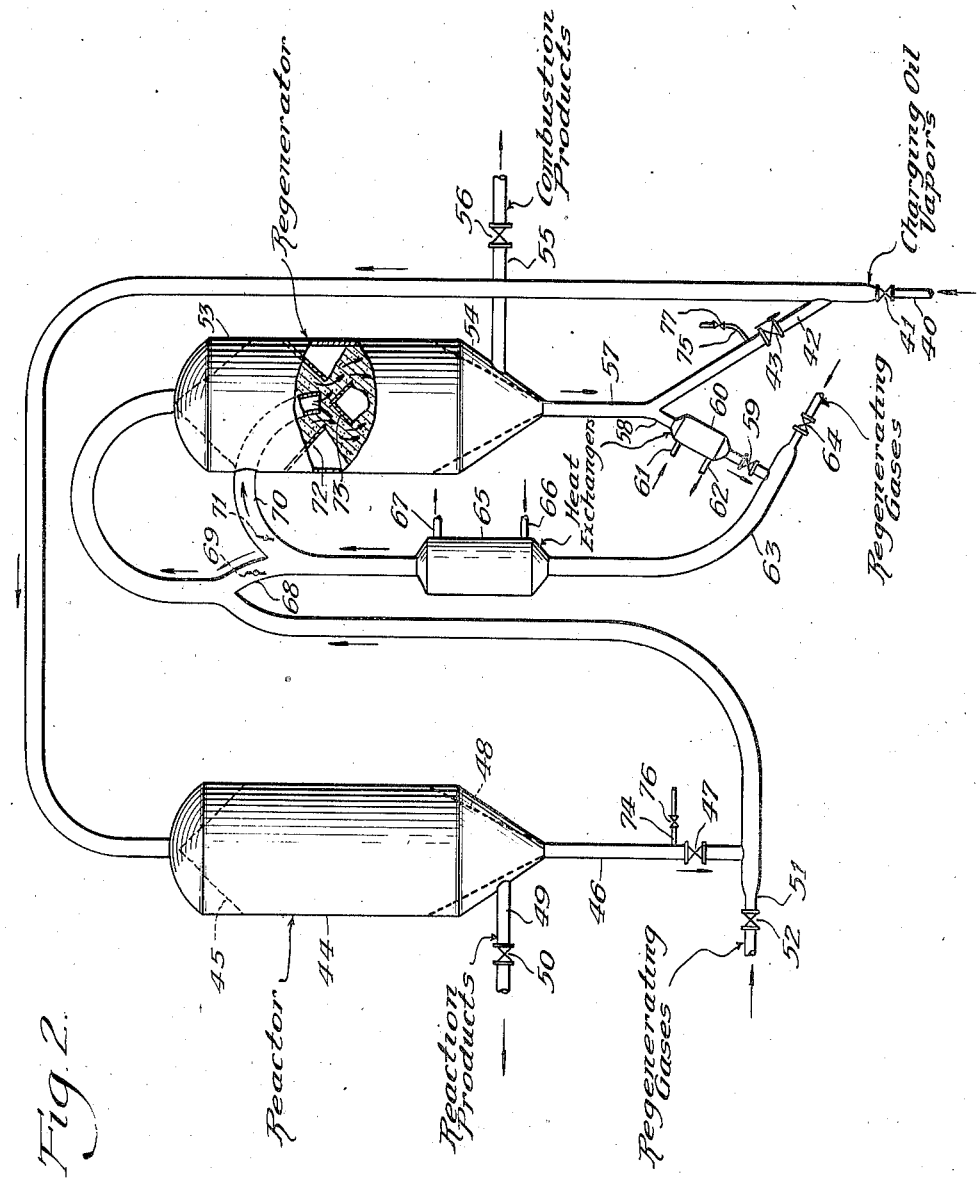

2,395,106

UNITED STATES PATENT OFFICE 2,395,106

PROCESS FOR CONTACTING FLUIDS WITH FINELY DIVIDED SOLID PARTICLES

Roland B. Day and Elmer R. Kanhofer, Riverside, Ill., assignors to Universal Oil Products Company, Chicago, Ill., a corporation of Delaware Application July 19, 1943, Serial No. 495,250

4 Claims. (Cl. 252—242)

This invention relates to an improved method of contacting fluids with finely divided solid particles and more particularly to a process for catalytically converting fluid reactants with the aid of finely divided solid catalysts.

The present invention is adapted for use in conducting many different types of catalytic reactions and more specifically to hydrocarbon conversion reactions such as catalytic cracking, catalytic dehydrogenation, catalytic aromatization, reprocessing, etc.

In catalytic cracking processes and the like, the catalyst particles accumulate in contaminatious deposit during the conversion period which in time renders the catalyst inactive for further processing. Various schemes have been proposed heretofore for continuously withdrawing contaminated catalyst from the reaction zone, regenerating it and returning the reactivated catalyst particles for further conversion of the reactant fluids.

Our invention provides a continuous process which is both economical of installation and operating costs and provides a flexible and easily regulated operation.

One of the features of our invention is the utilization of incoming reactant materials such as hydrocarbon vapors or regenerating gases for the transportation of catalyst particles between the reaction vessel and the regenerating vessel. By employing the incoming reactant materials, much mechanical equipment is eliminated. By obviating the need for mechanical conveyors or elevators, a considerable saving in critical materials as well as large power requirements for operating such equipment is realized. Very little additional power need be employed when utilizing the incoming reactant streams for the transportation of catalysts.

Another feature of our invention is the the extremely efficient contacting of fluids and finely divided solid particles which is obtainable. This is realized by supplying the catalyst or contact particles to the upper end of a contacting zone together with the fluids to be contacted and concurrently flowing both materials downwardly through the zone at different rates of speed. This results in a high concentration of contact material in the contacting zone with respect to the fluid materials and makes possible a higher degree of conversion. The relative downward flow of solid particles and fluid materials can be varied over a wide range thus offering a means for controlling the contacting to any desired degree.

Another feature of our invention is the uniform contacting and distribution of fluids and solids throughout the zone. This is effected by the ever-changing arrangement of solid particles in the downwardly moving contact mass.

Broadly our invention is a process for the contacting of fluids with finely divided solid particles which comprises commingling finely divided solid particles with a stream of fluid, passing the solid particle-carrying fluid stream into the upper end of an enlarged vertical contacting zone, said solid particles therein forming a substantial downwardly moving contact mass through which the fluid passes and separately withdrawing fluids and solid particles from the lower end of said enlarged contacting zone.

In a more specific embodiment, our invention comprises a process for the conversion of hydrocarbon oils which comprises commingling finely divided solid cracking catalyst particles with a stream of hydrocarbon oil vapors, passing the catalyst-carrying stream into the upper end of an enlarged vertical conversion zone maintained at cracking conditions, said catalyst particles therein forming a substantial downwardly moving contact catalyst mass through which the hydrocarbon oil vapors pass thereby being converted, separately withdrawing conversion products and used catalyst particles from the lower end of said enlarged conversion zone, recovering the conversion products, regenerating the catalyst particles and commingling the resultant reactivated catalyst with the incoming stream of hydrocarbon oil vapors.

The operating conditions and catalysts for the several processes which come within the scope of our invention are well known in the art and will not be discussed in detail herein. The catalyst particle size should be such that a reasonable pressure drop through the contacting zone is obtainable and yet be of such size that they may readily be handled by the incoming fluid reactant streams.

In order to more clearly illustrate the features and advantages of our invention, reference is made to the accompanying diagrammatic drawings and the following description thereof.

Figures 1 and 2 of the drawings illustrate diagrammatically two modifications of suitable apparatus in which our invention may be conducted.

Referring to Figure 1 in connection with a process for the catalytic cracking of hydrocarbon oils, vaporous hydrocarbons are introduced through line 1 controlled by valve 2 and commingled with active catalyst particles from line 3 controlled by valve 4. The catalyst-carrying stream enters the upper end of reactor 5 wherein the catalyst particles will form a compact mass 6. This mass of catalyst particles will be moved in a general downward direction through the reactor by withdrawing a portion thereof through line 7 controlled by valve 8, the quantity of catalyst particles withdrawn being, of course, equivalent to the quantity introduced through line 1. The conversion products will be separated from the catalyst mass by filtering screen 9 and withdrawn from the reactor through line 10 controlled by valve 11 to be directed to suitable separation and recovery equipment. The catalyst particles leaving reactor 5 by means of line 7 are commingled with a stream of regenerating gases controlled by valve 12 in line 13. The catalyst and regenerating gases containing oxygen are conducted into regenerator 14 wherein the carbonaceous deposit upon the catalyst is removed by combustion with the oxygen.

The particular regenerator shown in Figure 1 employs the so-called "fluidized" method of operation; that is, the incoming gases pass through the regenerator at such a velocity that some of the effect of gravity on the individual solid particles is overcome, thus resulting in a delayed or hindered settling of these particles. This hindered settling causes the formation of a relatively dense turbulent gas-solid particle phase in the lower portion of the vessel and a relatively disperse gas-solid particle phase in the upper portion of the vessel, the inter-face between these phases being indicated by broken line 15.

Combustion products after passing through separator 16 are removed from the system through line 17 and any catalyst particles separated from the effluent stream in separator 16 are returned to the dense phase in the regenerator by means of line 18. Catalyst particles are withdrawn from the lower portion of the regenerator through line 19, a portion of the withdrawn catalyst particles being directed through line 3 in valve 4 into the incoming oil vapor stream in line 1 and the balance of the withdrawn particles is directed through line 20 controlled by valve 21 to be commingled with additional regenerating gases controlled by valve 22 in line 23. The resultant catalyst-carrying gas stream is then passed through heat exchanger 24 and line 25 to be returned to the regenerator. Suitable heat convective fluid is directed into and removed from heat exchanger 24 by means of lines 26 and 27 respectively.

By cooling a portion of the catalyst in heat exchanger 24, the catalyst in regenerator 14 can be maintained at a uniform non-excessive regenerating temperature. The preferred temperatures for regenerating cracking catalyst are from 850° to 1200° F. Temperatures above this range generally result in premature, permanent loss of catalyst activity.

In order to prevent reaction materials from entering the regenerator and regenerating gases from entering the reaction zone, suitable stripping materials such as steam or flue gas may be introduced to lines 7 and 3, respectively, through line 28 controlled by valve 29 and line 30 controlled by valve 31.

Referring now to Figure 2, charging oil vapors are introduced to the system through line 40 controlled by valve 41 and are commingled with regenerated catalyst from line 42 controlled by valve 43. Together the oil vapors and catalyst particles enter the upper end of reactor 44 wherein the catalyst particles form a compact mass 45. A steady withdrawal of catalyst particles from the lower end of the reactor by means of line 46 controlled by valve 47 will cause a continuous downward movement of the contact mass, the amount of withdrawn catalyst, of course, being substantially equivalent to the quantity introduced into the upper end of the reactor. The hydrocarbon vapors pass through this compact mass of catalyst and after conversion are separated therefrom by means of perforate member 48, the separated conversion products being withdrawn from the reactor through line 49 controlled by valve 50 to be directed to suitable separation and recovery equipment.

The spent catalyst particles withdrawn from the reactor are commingled in line 51 with regenerating gases controlled by valve 52 and directed therewith into the upper portion of regenerator 53. In regenerator 53 another downward-moving compact contact mass is formed and the combustion products are separated from the catalyst particles by perforate member 54 and withdrawn through line 55 controlled by valve 56.

The regenerated catalyst particles are withdrawn through line 57 and all or a portion thereof directed through line 42 into line 40. A portion of the regenerated catalyst may be directed by means of line 58 controlled by valve 59 to heat exchanger 60. A suitable cooling medium may be introduced to and withdrawn from heat exchanger 60 by means of lines 61 and 62 respectively. The cooled catalyst is then commingled in line 63 with regenerating gases controlled by valve 64 and passed through a second heat exchanger 65. Heat exchanger 65 is similar to heat exchanger 60 and may be cooled by suitable convective fluid introduced thereto and withdrawn therefrom by means of lines 66 and 67 respectively. From heat exchanger 65 the cooled stream of catalyst regenerating gases is directed in part through line 68 controlled by butterfly valve 69 into line 51 to commingle with the spent catalyst and regenerating gases therein. Or all or a portion of the cooled regenerating gases and catalyst may be directed through line 70 controlled by butterfly valve 71 into an intermediate portion of regenerator 53. Suitable baffles 72 and 73 are arranged within regenerator 53 to aid in the distribution and intermixing of catalyst passing through the regenerator and cooled catalyst and regenerating catalyst introduced thereto through line 70.

By withdrawing and cooling a portion of the regenerated catalyst, a more uniform temperature may be maintained in the regenerator and hot spots of excessive temperatures are to a considerable extent eliminated. It is, of course, well within the scope of the invention to supply cool catalyst to more than one intermediate point in the regenerator in order to get a more uniform temperature therein. In some instances, either one or the other of the illustrated heat exchangers may be eliminated and remain within the scope of the invention.

In order to prevent hydrocarbon reactant material from entering the regenerator and regenerating gases from entering the reactor, the catalyst particles passing through lines 46 and 42 are stripped with a suitable inert fluid such as steam, nitrogen, flue gas, etc., introduced through lines 74 and 75, respectively, and controlled by valves 76 and 77.

We claim as our invention:

1. A process for regenerating solid particles contaminated with carbonaceous material which comprises passing a compact mass of said particles downwardly through a regeneration zone, passing an oxidizing gas through said regeneration zone concurrently with said compact mass, removing said carbonaceous material by combustion thereof, separately withdrawing combustion gases and a compact mass of regenerated solid particles from said regeneration zone, cooling at least a portion of the withdrawn particles in a zone external to said regeneration zone, and supplying cooled regenerated particles to the regeneration zone at an intermediate point thereof to commingle with the downwardly moving compact mass and thereby regulate the temperature of the solid particles undergoing regeneration.

2. The process defined in claim 1 further characterized in that said solid particles comprise solid catalyst particles.

3. A process for regenerating solid particles contaminated with carbonaceous material which comprises introducing a compact mass of said particles into the upper end of a regeneration zone and passing said compact mass downwardly through said regeneration zone, passing an oxidizing gas through said regeneration zone concurrently with said compact mass, removing said carbonaceous material by combustion thereof, withdrawing combustion gases from said regeneration zone, separately withdrawing a compact mass of regenerated solid particles from the lower end of said regeneration zone, cooling at least a portion of the withdrawn particles in a zone external to said regeneration zone, and supplying cooled regenerated particles to the regeneration zone at a point intermediate the upper and lower ends thereof to commingle with the downwardly moving compact mass and thereby regulate the temperature of the solid particles undergoing regeneration.

4. A process for regenerating solid particles contaminated with carbonaceous material which comprises introducing a compact mass of said particles into the upper end of a regeneration zone and passing said compact mass downwardly through said regeneration zone, passing an oxidizing gas through said regeneration zone concurrently with said compact mass, removing said carbonaceous material by combustion thereof, withdrawing combustion gases from said regeneration zone, separately withdrawing a compact mass of regenerated solid particles from the lower end of said regeneration zone, cooling at least a portion of the withdrawn particles in a zone external to said regeneration zone, commingling a portion of the cooled regenerated particles with said compact mass being introduced into the upper end of said regeneration zone, and supplying the remaining portion of the cooled regenerated particles to the regeneration zone at a point intermediate the upper and lower ends thereof to commingle with the downwardly moving compact mass and thereby regulate the temperature of the solid particles undergoing regeneration.

ROLAND B. DAY.
ELMER R. KANHOFER.